Figure 7:
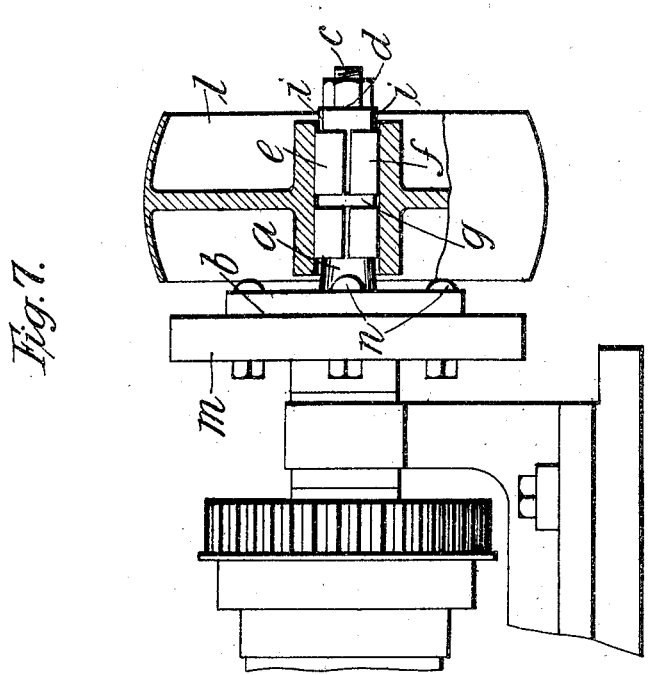

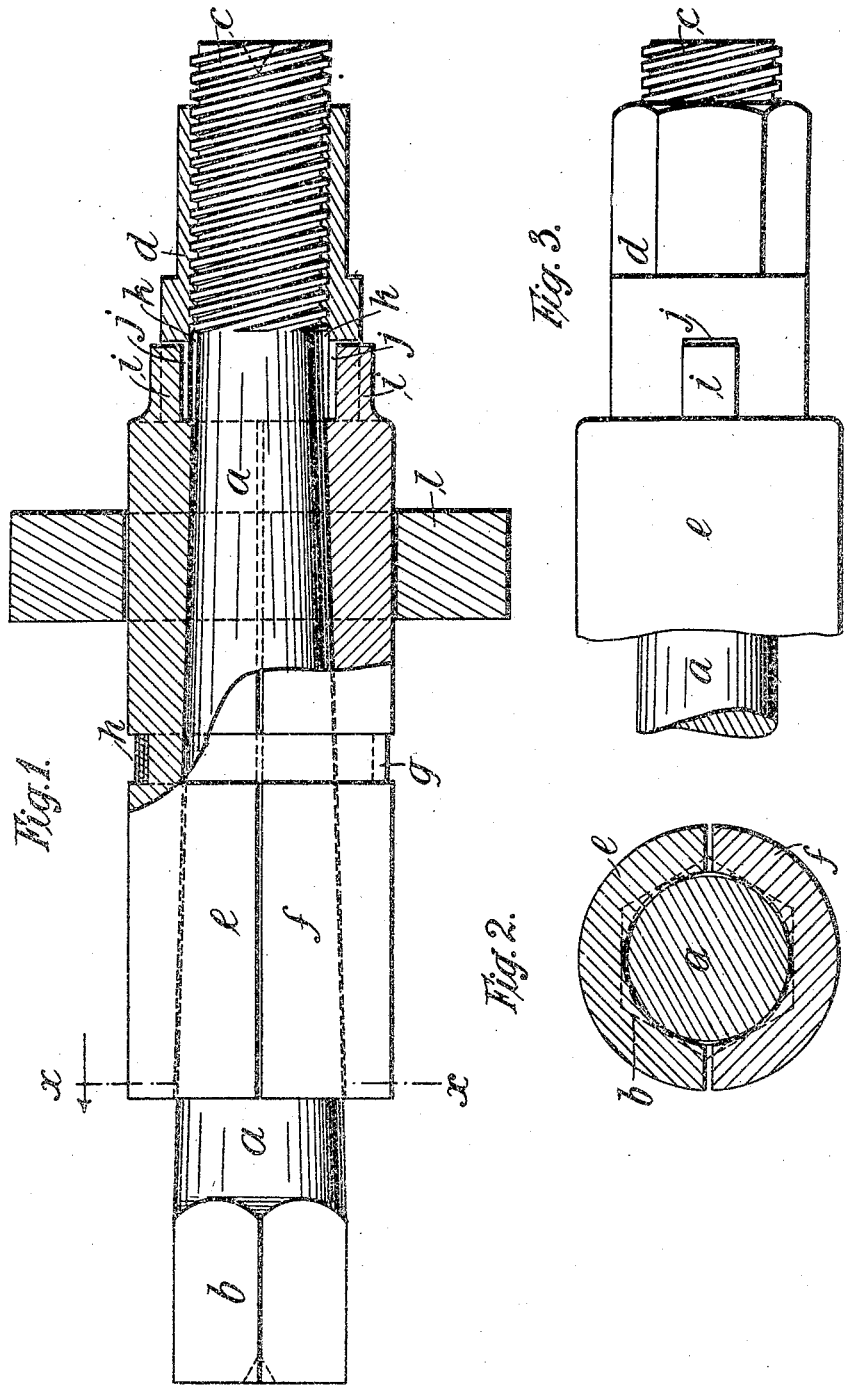

No. 794,411. PATENTED JULY 11, 1905.
C. J. JONES.
EXPANDING MANDREL OR ARBOR.
APPLICATION FILED FEB. 29, 1904.
3 SHEETS—SHEET 2.
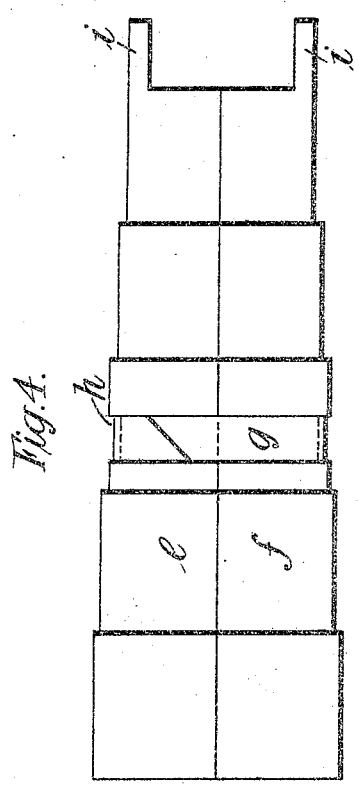
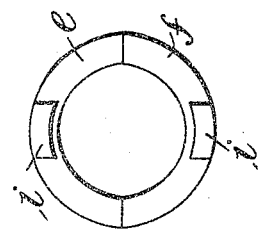
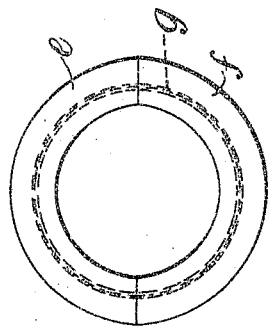
Witnesses.
Percy M. Goodwin.
Robt Hunter
Inventor. Charles James Jones
by His Attorney
Benj. T. Lewis No. 794,411. PATENTED JULY 11, 1905.
C. J. JONES.
EXPANDING MANDREL OR ARBOR.
APPLICATION FILED FEB. 29, 1904.

3 SHEETS—SHEET 3.

Witnesses.
Percy M. Goodwin.
Rob't Hunter

Inventor: Charles James Jones
by His Attorney
Benj. V. Ling

No. 794,411.

Patented July 11, 1905.

UNITED STATES PATENT OFFICE.

CHARLES JAMES JONES, OF HACKNEY, LONDON, ENGLAND.

EXPANDING MANDREL OR ARBOR.

SPECIFICATION forming part of Letters Patent No. 794,411, dated July 11, 1905.

Application filed February 29, 1904. Serial No. 195,861.

*To all whom it may concern:*

Be it known that I, CHARLES JAMES JONES, a subject of the King of Great Britain and Ireland, residing at 25 Casterton street, Hackney, London, England, have invented certain new and useful Improvements in Expanding Mandrels or Arbors, of which the following is a specification.

This invention relates to improvements in expanding arbors or mandrels, and has for its object the construction of a device whereby work to be operated upon either between lathe or other machine centers or held by a chuck or equivalent means can be mounted and held by means of internal pressure.

In carrying my said invention into practice I provide a plain taper arbor or mandrel at its major end with a head or driving end of any suitable shape or form to enable same to be held or to be turned by means of a key, spanner, or the like. The non-tapered minor end I furnish with a screw-thread. Upon said mandrel or arbor I mount an adjustable chuck-sleeve composed of two or more segments held or connected together by means of a spiral or equivalent spring, said spring fitting in a groove or recess, so as to be clear of the external periphery of the sleeve. Each segment of the sleeve I provide with a tenon or other shaped head for the purpose of engaging in radial slots in the body of a nut fitting on the screw-thread above mentioned and whose function is to traverse the sleeve in a longitudinal direction, so that the segments thereof are expanded by the taper arbor and hold the work mounted thereon.

In order that my said invention may be readily understood, reference is to be had to the following description and accompanying drawings, in which—

Figure 1 is a longitudinal elevation, partly in section. Fig. 2 is a transverse section on line $x\ x$, Fig. 1, in the direction of the arrow. Fig. 3 is a part plan view illustrating the tenon-slot and nut. Fig. 4 is a longitudinal elevation of a modified form of chuck-sleeve, and Figs. 5 and 6 are end views thereof. Fig. 7 illustrates an arbor with flanged head held by a face-plate or the like.

Like letters of reference indicate corresponding parts in the several figures.

$a$ represents the plain tapered arbor or mandrel having a hexagonal or other shaped head $b$ at its major end and a non-tapered threaded screw $c$ at its minor end, and working on said screw is a nut $d$, adapted to engage with and traverse the segments $e\ f$, forming the chuck-sleeve mounted on the arbor $a$, said segments being adjustably held together by means of the spiral or equivalent spring $g$, fitting in the recess or groove $h$, so as to be clear of the outer periphery of the segments. To engage the sleeve and nut, I provide on each segment a tenon or lug $i$, adapted to fit in slots $j$, Figs. 1 and 3, formed in the body of the nut $d$, and counterbore the nut at $k$, so that part of the taper mandrel may pass therein. The exterior of the nut $d$ I form corresponding in shape to the head $b$ of the arbor or mandrel and for a similar purpose. In order to obtain a proper grip and alinement, it is necessary to obtain two lines of contact between the internal or concave surface of each segment and the taper arbor, and this I effect by forming the concave surface to a curve, Figs. 2, 5, and 6, which is a compromise between the major and minor arcs of the arbor or mandrel upon which the segments work. The sleeve externally I form with a parallel cylindrical surface, as in Figs. 1 and 2, or, if desired, I may form the same to correspond with the interior or concave surface, as in Figs. 5 and 6, or I may make the same slightly polygonal in form, and, further, I may, as in Fig. 4, step the outer surface or cone the same, so that work $l$, Fig. 1, of more than one size may be mounted on the sleeve and held thereby.

In operation the chuck-sleeve is connected to the nut by means of the tenons or lugs engaging in the radial slots in the nut. The screwed end of the arbor or mandrel is then passed through the chuck-sleeve (held together as a whole by the spring) and screwed into the threaded portion of the nut, or vice versa, the nut being held stationary, thus bringing the tapered surface of the arbor into contact with the interior tapered surface or bore of the segments forming the sleeve and exerting pressure thereon in its effort to expand the sleeve when confined within the bore of the work $l$ to be operated upon.

A distinctive feature of this invention resides in the loose tenon-and-mortise interlocking connection between the chuck-sleeve and the traversing nut $d$. The function of this interlocking connection is to provide means for rotating the sleeve in either direction and to maintain the regular relative angular position of the segments. In tightening up or releasing the segments of the chuck-sleeve without such a connection as described the sleeve could not be released without driving the same off of the mandrel, whereas by the employment of the tenon-and-mortise connection between the sleeve and the nut the sections of the sleeve are compelled to open and close radially, as well as facilitating the release. In the releasing operation the turning of the nut backward carries the sleeve therewith in the same direction a sufficient distance to release the work, and a continued turning of the nut entirely off of the threaded end of the mandrel will carry the same out of engagement with the chuck-sleeve, thereby leaving the latter upon the mandrel, thus providing means for leaving the work and sleeve loose on the mandrel, so as to require no driving.

In Fig. 7 I illustrate the work supported at one end only. In this case I provide the mandrel with a flanged head $b$, so that the same may be bolted to the face-plate or the like $m$ by means of the bolts $n$.

Having now described my invention, what I claim as new, and desire to secure by Letters Patent, is—

1. In an arbor of the class described, a tapered mandrel having a threaded end, a traversing nut engaging said threaded end, and an expansible chuck-sleeve receiving the mandrel and having a longitudinal separable connection with the nut, said connection comprising means for interlocking the sleeve and nut in either direction of rotation.

2. In an arbor of the class described, a tapered mandrel having a threaded end, a traversing nut engaging said threaded end, and an expansible chuck-sleeve having a longitudinally-separable tenon-and-mortise interlocking connection with the nut.

3. In an arbor of the class described, a tapered mandrel having a threaded end, a nut engaging said threaded end, and an expansible sectional chuck-sleeve having its bore struck on curves with different centers to provide each section with a plurality of spaced points or lines of contact for the mandrel.

In testimony whereof I have affixed my signature in presence of two witnesses.

CHARLES JAMES JONES.

Witnesses:
 ROBT. HUNTER,
 P. M. GOODWIN.